United States Patent
Lawahmeh et al.

(10) Patent No.: US 7,573,155 B2
(45) Date of Patent: Aug. 11, 2009

(54) SYSTEMS AND METHODS FOR DISTRIBUTING LOADS

(75) Inventors: Ahmed Lawahmeh, Muncie, IN (US); Christopher S. Brune, Tigard, OR (US); Guido Politano, Middletown, IN (US)

(73) Assignees: Remy Inc., Anderson, IN (US); Sure Power, Inc., Tualatin, OR (US)

( * ) Notice: Subject to any disclaimer, the term of this patent is extended or adjusted under 35 U.S.C. 154(b) by 94 days.

(21) Appl. No.: 11/405,496

(22) Filed: Apr. 18, 2006

(65) Prior Publication Data

US 2006/0232248 A1    Oct. 19, 2006

Related U.S. Application Data

(60) Provisional application No. 60/672,520, filed on Apr. 19, 2005.

(51) Int. Cl.
*H02J 3/46* (2006.01)
*H02P 9/00* (2006.01)

(52) U.S. Cl. .............................. 307/47; 307/84; 322/22

(58) Field of Classification Search ................ 307/47, 307/84; 322/22
See application file for complete search history.

(56) References Cited

U.S. PATENT DOCUMENTS

| | | | |
|---|---|---|---|
| 2,504,768 A * | 4/1950 | Watson et al. ............. | 290/4 A |
| 3,809,996 A | 5/1974 | Meisenheimer | |
| 4,156,836 A * | 5/1979 | Wiley ..................... | 320/123 |
| 4,336,485 A * | 6/1982 | Stroud ..................... | 320/126 |
| 4,347,473 A * | 8/1982 | Stroud ..................... | 320/126 |
| 4,509,005 A | 4/1985 | Stroud | |
| 4,604,565 A * | 8/1986 | Yokota et al. .............. | 320/123 |
| 4,829,228 A * | 5/1989 | Buetemeister ............ | 322/27 |
| 4,916,504 A * | 4/1990 | Nakahara ................. | 257/69 |
| 5,194,757 A * | 3/1993 | Wertheim ................. | 307/87 |
| 5,254,936 A | 10/1993 | Leaf et al. | |
| 5,444,355 A * | 8/1995 | Kaneyuki et al. .......... | 322/58 |
| 5,739,676 A | 4/1998 | Judge et al. | |
| 7,105,938 B2 * | 9/2006 | Edelson .................. | 290/40 A |

* cited by examiner

*Primary Examiner*—Albert W Paladini
*Assistant Examiner*—Hal I Kaplan
(74) *Attorney, Agent, or Firm*—Finnegan, Henderson, Farabow, Garrett & Dunner

(57) ABSTRACT

Systems and methods for adjusting outputs of dynamoelectric devices, such as alternators, are provided. The outputs of the dynamoelectric devices may be balanced to facilitate load sharing among the devices. The outputs may be balanced by monitoring field signals associated with the dynamoelectric devices and controlling the field voltages of the devices. The outputs may also be adjusted to supply the load in dissimilar proportions.

30 Claims, 4 Drawing Sheets

SYSTEMS AND METHODS FOR DISTRIBUTING LOADS

RELATED APPLICATION

This application claims the benefit of U.S. Provisional Patent Application No. 60/672,520 entitled, "Systems and Methods for Distributing Loads," filed Apr. 19, 2005, which is expressly incorporated herein by reference to its entirety.

TECHNICAL FIELD

The present invention generally relates to electro-mechanical systems and, more particularly, to facilitating load sharing among electro-mechanical machines, such as alternators. In one example, the present invention balances outputs from alternators so as to equalize the duty cycle of each alternator.

BACKGROUND

Dynamoelectric machines, such as generators and alternators, are widespread. These machines usually include a stationary member, known as a "stator," and a rotating member, known as a "rotor," which turns in relation to the stationary member. Stators and rotors may include one or more windings of conductors. The rotor (sometimes referred to as an "armature") usually rotates within the stator (or "field"), which produces a rotating magnetic field. Typically, dynamoelectric machines also include internal or external voltage regulators, which adjust the rotor field current and voltage to control the output of the dynamoelectric machine.

Dynamoelectric machines, and particularly alternators, are often used to supply loads in vehicle applications. Certain vehicles, such as buses, airplanes, ambulances, etc., include high electrical loads and therefore require large amounts of electrical power. In such applications, multiple alternators/generators, that is, two or more, may be required to supply the load. When multiple machines are used in one application, however, the load may not be balanced among the machines. That is, one machine may carry a larger proportion of load than the other or others. For example, one alternator may be operating at full capacity while the other or others operate at lower capacity. If the load is not balanced among the alternators/generators, the system may become unstable, unreliable, and susceptible to failure.

SUMMARY

Methods, systems, and articles of manufacture consistent with the present invention may obviate one or more of the above and/or other issues. Consistent with the present invention, methods, systems and articles of manufacture are provided for facilitating load sharing among electro-mechanical machines, such as alternators.

Consistent with the present invention, a system for balancing dynamoelectric device outputs may be provided. The system may comprise: a first dynamoelectric device producing a first output and supplying a load; a second dynamoelectric device producing a second output and supplying the load; and a control module configured to substantially balance the first and second outputs, such that the first and second dynamoelectric devices supply the load in similar proportions, by monitoring a first field signal associated with the first dynamoelectric device and a second field signal associated with the second dynamoelectric device.

Consistent with the present invention, a system for balancing dynamoelectric device outputs may be provided. The system may comprise: means for monitoring a first field signal associated with a first dynamoelectric machine; means for monitoring a second field signal associated with a second dynamoelectric machine; and means for substantially balancing a first output of the first dynamoelectric machine and a second output of the second dynamoelectric machine by controlling a first field voltage of the first dynamoelectric machine and a second field voltage of the second dynamoelectric machine.

Consistent with the present invention, a circuit for balancing dynamoelectric machine outputs may be provided. The circuit may comprise: a first variable resistance coupled to a first sense terminal of a first dynamoelectric machine; a second variable resistance coupled to a second sense terminal of a second dynamoelectric machine; and a control module. The control module may include: a first input terminal for monitoring a first field signal associated with the first dynamoelectric machine; a second input terminal for monitoring a second field signal associated with the second dynamoelectric machine; and a processor for substantially balancing a first output of the first dynamoelectric machine and a second output of the second dynamoelectric machine by adjusting at least one of the first and second variable resistances.

Consistent with the present invention, a method of balancing dynamoelectric machine outputs may be provided. The method may comprise: monitoring a first field signal associated with a first dynamoelectric machine; monitoring a second field signal associated with a second dynamoelectric machine; and substantially balancing a first output of the first dynamoelectric machine and a second output of the second dynamoelectric machine by controlling a first field voltage of the first dynamoelectric machine and a second field voltage of the second dynamoelectric machine.

Consistent with the present invention, a method for adjusting dynamoelectric machine outputs may be provided. The method may comprise: monitoring a first field signal associated with a first dynamoelectric machine that supplies a load; monitoring a second field signal associated with a second dynamoelectric machine that supplies the load; and adjusting outputs of the first dynamoelectric machine and the second dynamoelectric machine, such that the first dynamoelectric machine and the second dynamoelectric machine supply the load in dissimilar proportions, by controlling a first field voltage of the first dynamoelectric machine and a second field voltage of the second dynamoelectric machine.

The foregoing background and summary are not intended to be comprehensive, but instead serve to help artisans of ordinary skill understand implementations consistent with the present invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with the invention. Other implementations may be used and structural and procedural changes may be made without departing from the scope of the present invention.

Figure 1A:
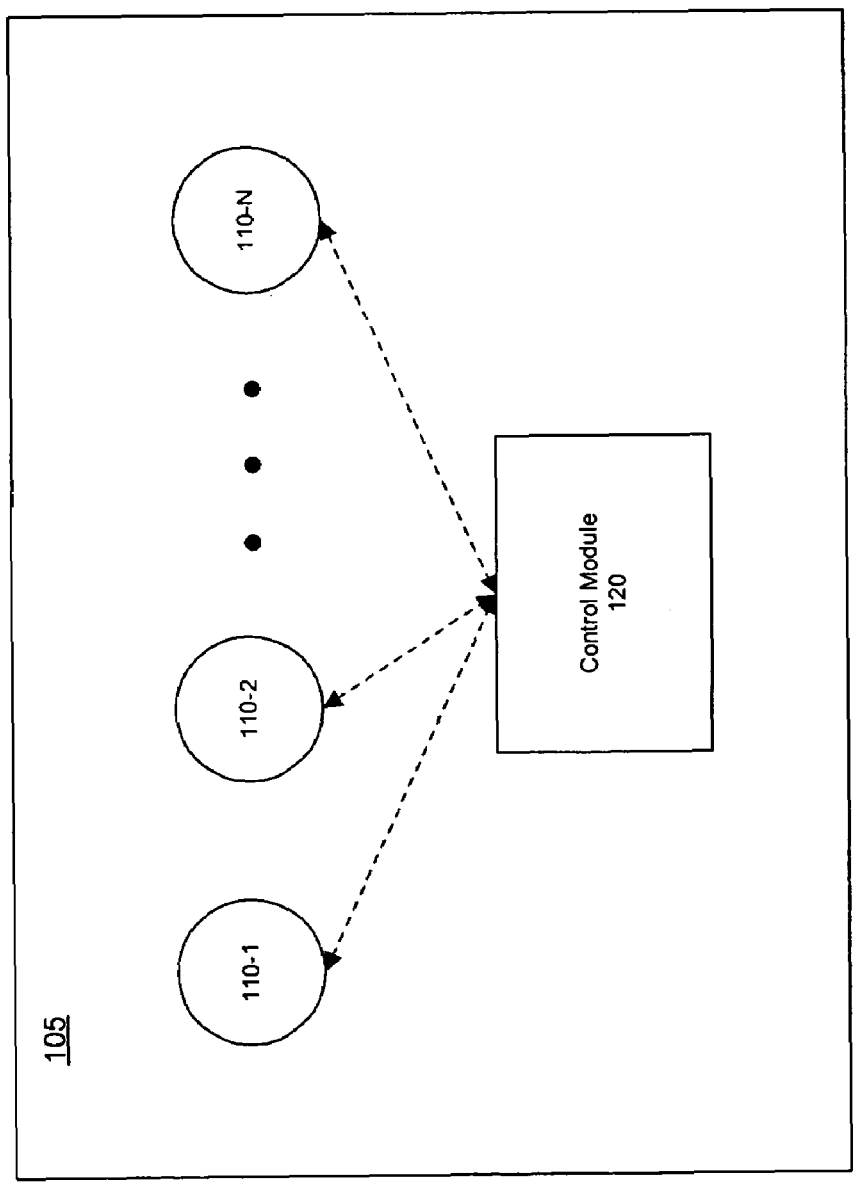
FIG. 1A illustrates an exemplary environment consistent with the present invention.

FIG. 1A illustrates an exemplary environment 100 consistent with the present invention. As illustrated, environment 100 may include a system 105, which may comprise one or more electro-mechanical machines 110-(1-N) coupled to one or more control modules 120.

Figure 1B:
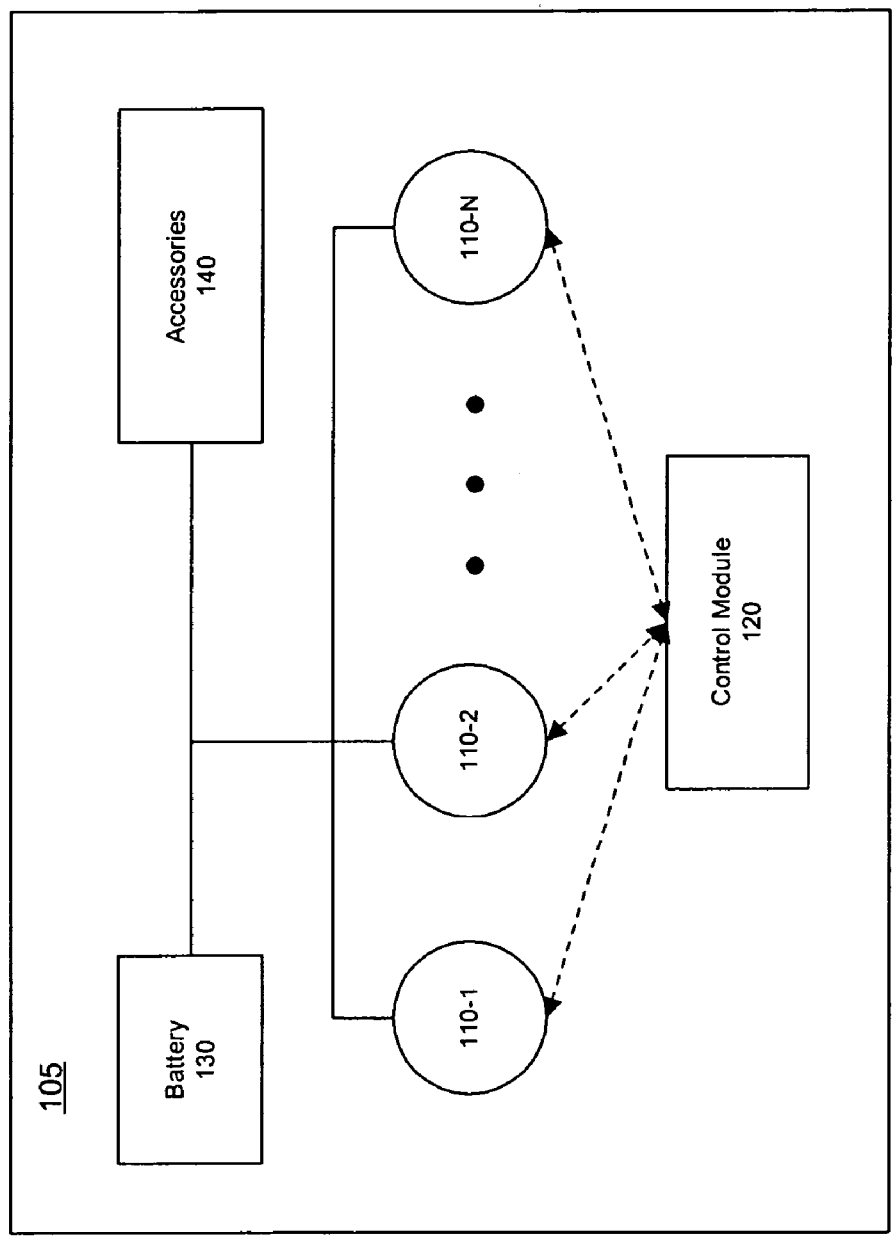
FIG. 1B illustrates an exemplary system consistent with the present invention.

System 105 may include one or more electrical and/or electro-mechanical systems and may be suitable for use in a variety of applications, including vehicle, material handling, marine, and aircraft applications. In one particular example, system 105 may include an electrical system (for example, as illustrated in FIG. 1B, a charging system) located in a vehicle, such as a passenger bus. In addition to electro-mechanical machines 110-(1-N) and control module 120, system 105 may include various other components and accessories not shown, depending on the application. For example, system 105 may include one or more batteries, starters, switches, fuses, lamps, radios, sensors, gauges, etc. System 105 may include one or more DC components and/or one or more AC components (single- or poly-phase).

Electro-mechanical machines 110-(1-N) may include various machines, such as those that convert mechanical energy into electrical energy, that is, dynamoelectric machines. In one example, electro-mechanical machines 110-(1-N) may include one or more alternators, which supply one or more loads. Each of electro-mechanical machines 110-(1-N) may include various components known in the art, such as stator assemblies, rotor assemblies, solenoid assemblies, controllers, pulleys, belts, springs, gears, brushes, casings, brackets, heat sinks, valves, seals, pins, sensors, terminals, fan assemblies, etc. Such machines may also include appropriate air intake and discharge apertures. Each of electro-mechanical machines 110-(1-N) may also include one or more internal or external regulators for monitoring/sensing voltages and/or adjusting rotor field currents and/or voltages. In addition, electro-mechanical machines 110-(1-N) may include one or more rectifiers (for example, a diode rectifier bridge), which may convert alternating current into direct current.

Control module 120 may be implemented by one or more software, hardware, and/or firmware components. Control module 120 may include one or more electrical, mechanical, and/or electro-mechanical components. Control module 120 may be configured to control electro-mechanical machines 110-(1-N), for example, to adjust the outputs of the machines to facilitate load sharing. Further details of control module 120 are described below in connection with FIG. 1B.

In FIG. 1B, system 105 may represent a charging system located in a vehicle. In the illustrated configuration, electro-mechanical machines 110-(1 -N) in system 105 may represent alternators, which may include, for example, one or more Delco Remy® alternators. As illustrated, the alternators may be coupled (for example, via charge-transporting media) to control module 120. The alternators may also be coupled (for example, via charge-transporting media) to one or more batteries 130 and one or more accessories 140, which may collectively present an electrical load to the alternators. As used herein, the term "load" refers to any source of power consumption. A "load" may also refer to an amount of power supplied by electro-mechanical machine. The number and arrangement of elements illustrated in FIG. 1B is exemplary and may vary depending on the application. Further, system 105 may lack certain illustrated elements and/or include additional elements not illustrated in FIG. 1B.

Battery 130 may include any mechanism capable of generating electrical energy. In one implementation, battery 130 may include one or more series-connected chemical cells for producing a DC voltage. Battery 130 may provide an amount of voltage compatible with the requirements of system 105 (for example, the requirements of accessories 140). Battery 130 may provide, for example, 12 volts, 24 volts, 36 volts, etc. Although a single battery is illustrated, system 105 may include any number of batteries, depending on the application.

Accessories 140 may include one or more power-consuming devices, such as air conditioners, fans, radios, communication devices, lights, microprocessors, etc. The number and type of accessories will vary depending on the application. In addition, the accessories may be dispersed in varying locations within system 105.

Control module 120 of system 105 may be configured to control alternators 110-(1-N) to adjust the outputs of the alternators and to facilitate load sharing among the alternators. In one example, control module 120 may adjust the outputs of alternators 110-(1-N) to achieve load sharing among the alternators. Control module 120 may substantially balance (for example, to within +/− 10%) the outputs of alternators 110-(1-N) such that the alternators supply the load in similar or substantially equal proportions. Control module 120 may control the alternators so that the alternators contribute to or share a given load presented by battery 130 and accessories 140 equally. Control module 120 may be configured to divide a given load evenly (+/− 10%) among the alternators. Control module 120 may also be configured to control the alternators such that each alternator is operating at the same percentage of its capacity or at the same duty cycle.

Consistent with the present invention, control module may be configurable to achieve load sharing among alternators 110-(1-N) to within various tolerances, which may be adjustable. For example, control module 120 may be configured to divide the load evenly, or balance outputs and/or duty cycles, among the alternators to within various tolerances, such as +/− 5%, +/− 10%, +/− 15%, +/− 20%, etc.

In alternative implementations, control module 120 may be configurable to achieve unequal load sharing. That is, control module 120 may be configured to adjust the outputs of the alternators such that the alternators supply the load in dissimilar proportions. Control module 120 may adjust the outputs and distribute a given load, e.g., presented by battery 130 and accessories 140, unevenly among the alternators. In one example, control module 120 may control the alternators such that alternator 110-1 carries 75% of the load while alternator 110-2 carries 25% of the load. Control module 120 may also control the alternators such that alternator 110-1 operates at a 40% duty cycle while alternator 110-2 operates at a 70% duty cycle. In such implementations, various tolerances (5%, 10%, 15%, 20%, etc.) may be specified.

Control module 120 may balance or substantially balance the outputs of alternators 110-(1-N) to achieve load sharing. In one configuration, control module 120 may balance the alternator outputs to achieve load sharing by controlling the field voltages of the alternators. In such a configuration, control module 120 may perform one or more operations to adjust the voltage applied to the external sense input of each alternator regulator in an effort to equalize the field voltage or duty cycle of each alternator. By equalizing the field voltages or duty cycles, control module 120 may substantially balance the outputs of the alternators.

Control module 120 may balance the outputs of the alternators (for example, by equalizing the field voltage of each alternator) regardless of each alternator's rating. As an example, assume control module 120 is coupled to a 100 amp ("A") alternator and a 50 A alternator. By equalizing the field voltage of these alternators, control module 120 may balance the outputs of the alternators such that each alternator is operating at the same duty cycle or percentage of its capacity. The particular percentage may vary and be predetermined. Control module 120 could, for instance, equalize the field voltages so that each alternator operates at a 50% duty cycle. Assuming ideal alternator operation, this would cause the 100 A alternator to produce a 50 A output and the 50 A alternator to produce a 25 A output.

Control module 120 may balance alternator outputs (for example, by controlling the field voltages) based on field signals associated with the alternator. A field signal may reflect the field (i.e., rotor) voltage of the particular alternator and may serve as a basis for determining the duty cycle of the alternator. The duty cycle could be determined based on the field voltage, field signal wave, or field signal frequency. Control module 120 could monitor a field signal from each alternator and, based on those signals, adjust the field voltage (duty cycle) in each alternator to balance the alternator outputs. Monitoring the field signal could include monitoring a field voltage and/or a duty cycle. The field signal could be monitored directly from the rotor or could be monitored via a field "monitor" signal provided from a regulator or other signal source coupled to the alternator. In one example, the field monitor signal may include a replica of the field signal and may be obtained from the field signal through a resistance. Alternatively, the field monitor signal may include an inverse of the field signal and may be obtained from the field signal through a circuit, such as a pull-push circuit.

In one exemplary mode of operation, control module 120 may determine if a particular alternator needs to produce more current (for example, carry more of the load) by monitoring field signals associated with the alternators. As discussed above, the field signal could be provided directly from the field (or rotor), from a regulator, or from another source, depending on the specific configuration of the alternator. Once control module 120 determines that an alternator needs to produce more output (or that an alternator is working too hard), control module 120 may perform one or more operations to adjust the output of the alternator accordingly. To adjust the output of an alternator, control module 120 may cause an increase in current and/or voltage provided to an alternator. For example, if control module 120 determines that alternator 110-2 needs to carry more of the system load, control module 120 may cause a voltage regulator coupled to alternator 110-2 to provide alternator 110-2 with additional current. Control module 120 may cause the regulator to provide additional current by decreasing the voltage sensed at the sense terminal of that alternator.

In an alternative configuration and mode of operation, control module 120 may balance/distribute the load among alternators working together in system 105 by equalizing the output voltage of each alternator. Control module 120 may monitor the output voltage of each alternator and open the sense line for the alternator having the higher voltage set point. Opening the sense line will cause the alternator to default to the internal sense, which will cause the voltage set point in the alternator to drop. As a result, the other alternator (s) in the system will handle more of the system load.

Figure 2:
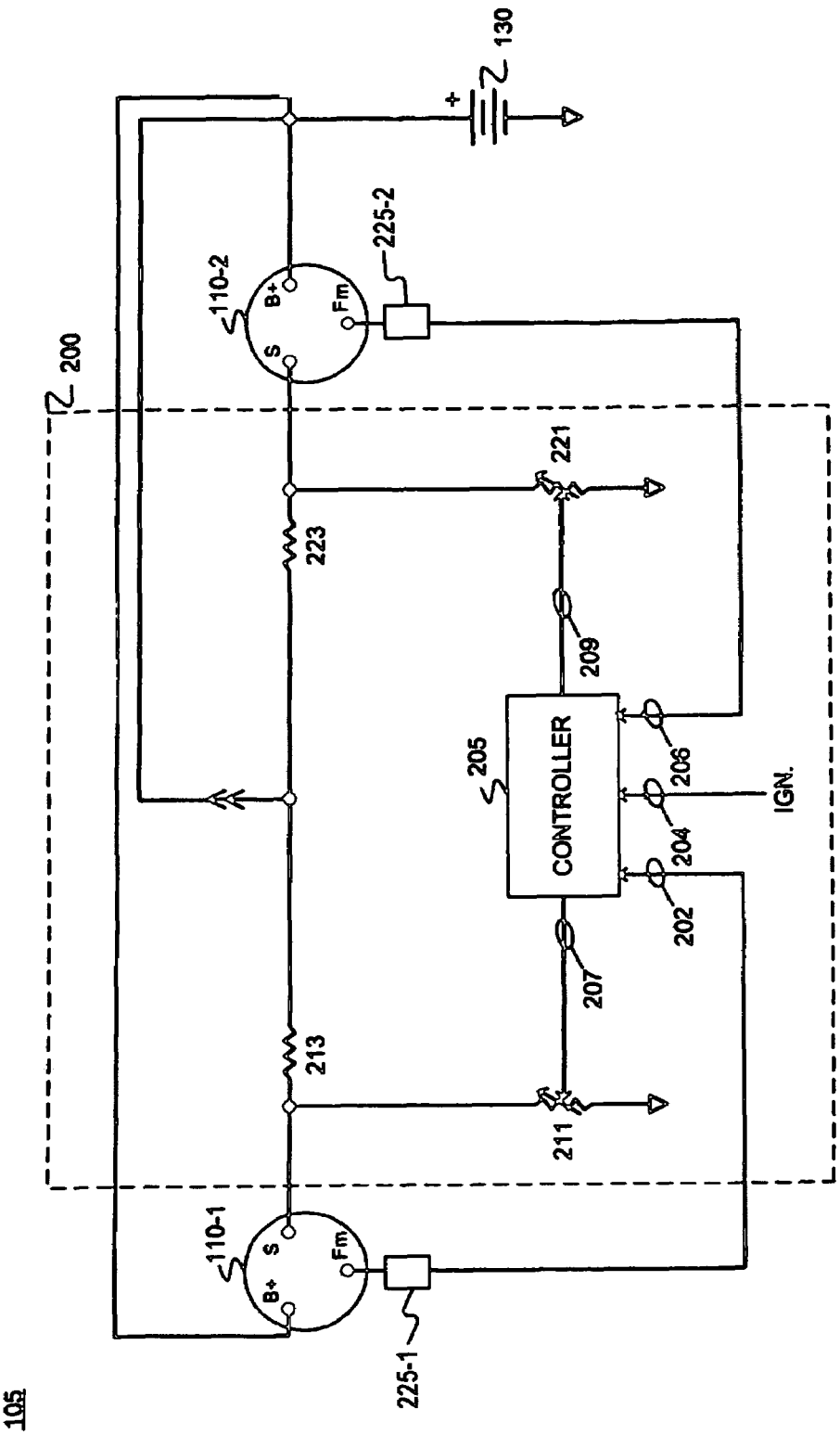
FIG. 2 illustrates an exemplary implementation of a control module consistent with the present invention.

FIG. 2 illustrates an exemplary implementation of control module 120 consistent with the present invention. In FIG. 2, control module 120 is implemented by a circuit 200, which may be coupled to components of system 105. As illustrated, two alternators (110-1 and 110-2) and a battery (for example, battery 130) may be coupled to circuit 200. The components of circuit 200 may be coupled via any combination of media capable of conducting electricity. Likewise, alternators 110-1 and 110-2, as well as the battery, may be coupled to circuit 200 via similar conducting media. Accordingly, all of the connections and terminals depicted in FIG. 2 may represent charge-transporting media.

Each of alternators 110-1 and 110-2 may include various components known in the art, such as a rotor that rotates about a stator, one or more regulators (225-1, 225-2), and one or more rectifiers. In addition, as illustrated, alternators 110-1 and 110-2 may include an "S" terminal for sensing a voltage (for example, battery voltage), a "B" terminal serving as an output terminal, and an "Fm" terminal providing a field signal. Alternators 110-1 and 110-2 may be of various voltage (for example, 12V, 24V, etc.) and current ratings, and the alternators may have the same or different ratings with respect to each other.

As illustrated in FIG. 2, circuit 200 may include a controller 205. Controller 205 may include one or more hardware, software, and/or firmware components. Controller 205 may include one or more electrical, mechanical, and/or electro-mechanical components. In one example, controller 205 may include a microprocessor. Controller 205 may include one or more input terminals (202, 206) for receiving field signals from alternators 110-1 and 110-2. Controller may also include one or more input terminals (204) for receiving an ignition signal ("IGN."), which may be used to activate and deactivate controller 205. In one configuration, circuit 205 may include one or more variable resistors (211 and 221) coupled to the "S" terminals of alternators 110-1 and 110-2 and to output terminals (207, 209) of controller 205. Additional resistors (213, 223) may also be coupled to the "S" terminals.

Controller 205 may be activated via a signal received via terminal 204. In operation, controller 205 may monitor field signals associated with alternators 110-1 and 110-2 via terminals 202 and 206. As discussed above, the field signal could be provided directly from the field (or rotor), from a regulator, or from another source, depending on the specific configuration of the alternator. Controller 205 may determine if an alternator needs to produce more output (or that an alternator is working too hard) based on the field signals. To adjust the output of a particular alternator, controller 205 may increase or decrease the resistance of variable resistor 211 and/or variable resistor 221 as appropriate. Adjusting the value of resistors 211 and 221 may cause a corresponding voltage adjustment at the "S" terminals of the alternators. This voltage adjustment will cause the alternator regulators to increase or decrease the field voltage or current to increase or decrease alternator output.

As an example, assume controller 205 determines (for example, by analyzing the field voltage or duty cycle of each alternator via the field signals) that alternator 110-1 is carrying more load than alternator 110-2 and that alternator 110-2 needs to produce more output. In this case, controller 205 would decrease the resistance of variable resistor 221 to create a voltage drop at the "S" terminal of alternator 110-2. As a result of this voltage drop, the regulator of alternator 110-2 will increase the field voltage (and/or current) in alternator 110-2 to increase the output of the alternator. In this fashion, circuit 200 may balance the outputs of alternators 110-1 and 110-2.

Consistent with the present invention, control module 120 may balance the outputs of any number of alternators. Accordingly, while FIG. 2 depicts two alternators, the circuit may be configured to accommodate additional alternators.

Figure 3:
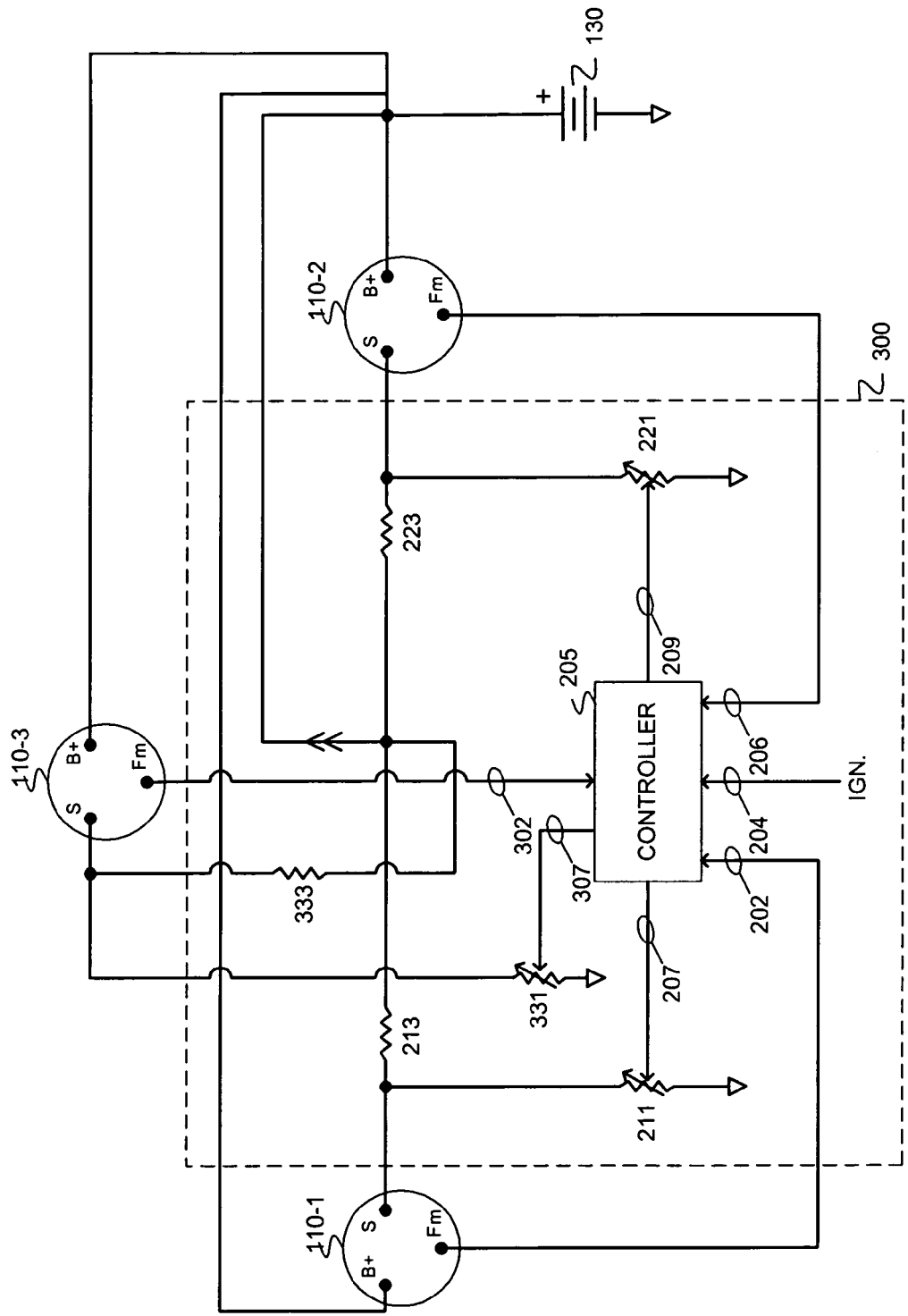
FIG. 3 illustrates another exemplary implementation of a control module consistent with the present invention.

FIG. 3 illustrates another implementation of control module 120, in which the control module may balance the outputs of three alternators. In FIG. 3, control module 120 is implemented by a circuit 300, to which three alternators (110-1, 110-2, and 110-3) and a battery (for example, 130) are coupled. Certain components of circuit 300 may be similar to those described above in connection with circuit 200. As illustrated in FIG. 3, circuit 300 may include additional resistors 331 and 333, resistor 331 being variable. In addition, controller 205 may include an additional input terminal (302) for receiving a field signal from alternator 110-3 and an additional output terminal (307) coupled to variable resistor 331. In operation, circuit 300 may balance alternator outputs in a manner similar to that described above in connection with circuit 200.

For purposes of explanation only, aspects of system 105, control module 120, and circuits 200 and 300 are described with reference to the elements and components illustrated in FIGS. 1A, 1B, 2, and 3. The number and arrangement of components in system 105, control module 120, and circuits 200 and 300 are not limited to what is shown and other variations in the number and arrangement of components are possible, consistent with the present invention. Further, depending on the implementation, system 105, control module 120, and circuits 200 and 300 may lack certain illustrated components and/or contain, or be coupled to, additional or varying components not shown.

The foregoing description of possible implementations consistent with the present invention does not represent a comprehensive list of all such implementations or all variations of the implementations described. The description of only some implementations should not be construed as an intent to exclude other implementations. Artisans will understand how to implement the invention in the appended claims in many other ways, using equivalents and alternatives that do not depart from the scope of the following claims.

What is claimed is:

1. A system comprising:
a first dynamoelectric device producing a first output and supplying a load;
a second dynamoelectric device producing a second output and supplying the load; and
a control module configured to independently balance the first and second outputs, such that the first and second dynamoelectric devices supply the load in similar proportions, by directly monitoring a first field signal associated with a rotor of the first dynamoelectric device and a second field signal associated with a rotor of the second dynamoelectric device, and adjusting both the first dynamoelectric device and the second dynamoelectric device to balance the first and second outputs.

2. The system of claim 1, wherein the first dynamoelectric device is a first alternator and the second dynamoelectric device is a second alternator.

3. The system of claim 2, wherein the first and second alternators are embedded in a vehicle.

4. The system of claim 1, wherein the control module determines a first duty cycle of the first dynamoelectric device from the first field signal and determines a second duty cycle of the second dynamoelectric device from the second field signal.

5. The system of claim 4, wherein the control module substantially balances the first and second outputs such that the first and second duty cycles are substantially balanced.

6. The system of claim 1, wherein the first field signal reflects a field voltage of the first dynamoelectric device and the second field signal reflects a field voltage of the second dynamoelectric device.

7. The system of claim 1, wherein the first dynamoelectric device includes a first sense terminal and the second dynamoelectric device includes a second sense terminal, and wherein the control module substantially balances the first and second outputs by adjusting at least one of a first sense voltage at the first sense terminal and a second sense voltage at the second sense terminal.

8. The system of claim 7, wherein the control module adjusts at least one of the first and second sense voltages by decreasing at least one of a first resistance and a second resistance respectively coupled to the first and second sense terminals.

9. The system of claim 1, wherein the control module substantially balances the first and second outputs by controlling a first field voltage and a first field current supplied to the first dynamoelectric device and a second field voltage and a second field current supplied to the second dynamoelectric device.

10. The system of claim 9, wherein the first dynamoelectric device includes a first sense terminal and the second dynamoelectric device includes a second sense terminal, and wherein the control module controls the first and second field voltages and the first and second field currents by adjusting at least one of a first sense voltage at the first sense terminal and a second sense voltage at the second sense terminal.

11. The system of claim 10, wherein the control module adjusts at least one of the first and second sense voltages by decreasing at least one of a first resistance and a second resistance respectively coupled to the first and second sense terminals.

12. The system of claim 1, wherein the first field signal is monitored directly from a first rotor of the first dynamoelectric device and the second field signal is monitored directly from a second rotor of the second dynamoelectric device.

13. The system of claim 1, wherein the first field signal is monitored via a first field monitor signal provided by a first regulator coupled to the first dynamoelectric device and the second field signal is monitored via a second field monitor signal provided by a second regulator coupled to the second dynamoelectric device.

14. The system of claim 13, wherein the first field monitor signal directly corresponds to the first field signal and the second field monitor signal directly corresponds to the second field signal.

15. The system of claim 13, wherein the first field monitor signal is provided through a pull-push circuit and includes an inverse of the first field signal.

16. The system of claim 15, wherein the second field monitor signal directly corresponds to the second field signal.

17. The system of claim 1, wherein the control module includes at least one microprocessor.

18. The system of claim 1, further comprising a third dynamoelectric device producing a third output and supplying the load.

19. The system of claim 18, wherein the control module is further configured to substantially balance the first, second, and third outputs, such that the first, second, and third dynamoelectric devices supply the load in similar proportions.

20. The system of claim 1, wherein the control module substantially balances the first and second outputs such that the first output and the second output differ by less than 10 percent.

21. A method for balancing dynamoelectric machine outputs, the method comprising:
    directly monitoring a first field signal associated with a rotor of a first dynamoelectric machine;
    directly monitoring a second field signal associated with a rotor of a second dynamoelectric machine;
    independently balancing a first output of the first dynamoelectric machine and a second output of the second dynamoelectric machine by controlling a first field voltage of the first dynamoelectric machine and a second field voltage of the second dynamoelectric; and
    adjusting both the first dynamoelectric device and the second dynamoelectric device to balance the first and second outputs.

22. The method of claim 21, wherein monitoring the first field signal includes determining a duty cycle of the first dynamoelectric machine based on the first field signal.

23. The method of claim 21, wherein monitoring the first field signal includes monitoring a first field voltage of the first dynamoelectric machine.

24. The method of claim 23, wherein monitoring the second field signal includes determining a duty cycle of the second dynamoelectric machine based on the second field signal.

25. The method of claim 21, wherein substantially balancing the first and second outputs includes adjusting at least one resistance to control the first and second field voltages.

26. The method of claim 21, wherein substantially balancing the first and second outputs includes balancing the first and second outputs such that the first output and the second output differ by less than 10 percent.

27. A circuit for balancing dynamoelectric machine outputs, the circuit comprising:
    a first variable resistance coupled to a first sense terminal of a first dynamoelectric machine;
    a second variable resistance coupled to a second sense terminal of a second dynamoelectric machine; and
    a control module, including:
        a first input terminal for directly monitoring a first field voltage associated with a rotor of the first dynamoelectric machine;
        a second input terminal for directly monitoring a second field voltage associated with a rotor of the second dynamoelectric machine; and
        a processor for independently balancing a first output of the first dynamoelectric machine and a second output of the second dynamoelectric machine by adjusting the first and second variable resistances.

28. The circuit of claim 27, wherein the first and second dynamoelectric machines include alternators.

29. A system comprising
    means for directly monitoring a first field signal associated with a rotor of a first dynamoelectric machine;
    means for directly monitoring a second field signal associated with a rotor of a second dynamoelectric machine; and
    means for independently balancing a first output of the first dynamoelectric machine and a second output of the second dynamoelectric machine by controlling a first field voltage of the first dynamoelectric machine and a second field voltage of the second dynamoelectric machine; and
    means for adjusting both the first dynamoelectric device and the second dynamoelectric device to balance the first and second outputs.

30. A method for adjusting dynamoelectric machine outputs, comprising:
    directly monitoring a first field signal associated with a rotor of a first dynamoelectric machine that supplies a load;
    directly monitoring a second field signal associated with a rotor of a second dynamoelectric machine that supplies the load; and
    adjusting outputs of the first dynamoelectric machine and the second dynamoelectric machine, such that the first dynamoelectric machine and the second dynamoelectric machine supply the load in dissimilar proportions, by controlling a first field voltage of the first dynamoelectric machine and a second field voltage of the second dynamoelectric machine.

* * * * *